United States Patent
Gates, III et al.

(10) Patent No.: US 8,012,023 B2
(45) Date of Patent: Sep. 6, 2011

(54) VIRTUAL ENTERTAINMENT

(75) Inventors: William H. Gates, III, Medina, WA (US); Gary W. Flake, Bellevue, WA (US); Alexander G. Gounares, Kirkland, WA (US); Thomas F. Bergstraesser, Kirkland, WA (US); Arnold N. Blinn, Hunts Point, WA (US); Christopher W. Brumme, Mercer Island, WA (US); Lili Cheng, Bellevue, WA (US); Michael Connolly, Seattle, WA (US); Daniel S. Glasser, Mercer Island, WA (US); James R. Larus, Mercer Island, WA (US); Matthew B. MacLaurin, Woodinville, WA (US); Henricus Johannes Maria Meijer, Mercer Island, WA (US); Debi P. Mishra, Bellevue, WA (US); Amit Mital, Kirkland, WA (US); Ira L. Snyder, Jr., Bellevue, WA (US); Melora Zaner-Godsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 577 days.

(21) Appl. No.: 11/536,449

(22) Filed: Sep. 28, 2006

(65) Prior Publication Data
US 2008/0079752 A1 Apr. 3, 2008

(51) Int. Cl.
*A63F 13/00* (2006.01)
(52) U.S. Cl. .............. 463/40; 463/31; 715/706
(58) Field of Classification Search ......... 463/31, 463/34, 40, 41, 43; 715/706
See application file for complete search history.

(56) References Cited

U.S. PATENT DOCUMENTS

| | | | |
|---|---|---|---|
| 5,263,165 A | 11/1993 | Janis | |
| 5,495,576 A * | 2/1996 | Ritchey | 345/420 |
| 5,537,404 A | 7/1996 | Bentlet et al. | |
| 5,588,914 A * | 12/1996 | Adamczyk | 463/32 |
| 5,774,668 A | 6/1998 | Choquier et al. | |
| 5,850,352 A | 12/1998 | Moezzi et al. | |
| 5,859,972 A | 1/1999 | Subramaniam et al. | |

(Continued)

FOREIGN PATENT DOCUMENTS

EP 0915595 A2 5/1999
(Continued)

OTHER PUBLICATIONS

Brunner, et al. "Disruption Tolerant Networking" Dagstuhl Seminar Proceedings (2005) NEC Europe Ltd., Network Labooratories, 4 pages.

(Continued)

*Primary Examiner* — James S McClellan
(74) *Attorney, Agent, or Firm* — Lee & Hayes, PLLC

(57) ABSTRACT

Systems and methods that provide for a virtual reality entertainment system that supplies immersive entertainment and creates a sensation for a user similar to having guests in a remote location to be physically present as virtual guests. Such virtual reality entertainment system can supply a graphic and/or audio; wherein interconnected computers, video and audio processing devices, supply a live interaction between a user and a guest(s). Although guests are only present virtually (e.g., electronically present with other objects/user within the environment) such virtual invitation enables a user and guests to concurrently experience the entertainment together (e.g., a live sporting event, spectator game). In a related aspect, the subject innovation can implement holographic avatars, and a plurality of communication interfaces, to imitate (and/or transform) a relationship between the user and the virtual guests/surrounding environment.

20 Claims, 13 Drawing Sheets

U.S. PATENT DOCUMENTS

| | | | |
|---|---|---|---|
| 5,926,179 | A | 7/1999 | Matsuda et al. |
| 6,040,841 | A | 3/2000 | Cohen et al. |
| 6,064,656 | A | 5/2000 | Angal et al. |
| 6,128,004 | A * | 10/2000 | McDowall et al. ........... 345/158 |
| 6,185,567 | B1 | 2/2001 | Ratnaraj et al. |
| 6,195,683 | B1 | 2/2001 | Palmer et al. |
| 6,209,039 | B1 | 3/2001 | Albright et al. |
| 6,226,260 | B1 | 5/2001 | McDysan |
| 6,325,717 | B1 | 12/2001 | Kawagoe et al. |
| 6,341,127 | B1 | 1/2002 | Katsube et al. |
| 6,352,479 | B1 | 3/2002 | Sparks, II |
| 6,409,599 | B1 * | 6/2002 | Sprout et al. ..................... 463/31 |
| 6,415,288 | B1 | 7/2002 | Gebauer |
| 6,434,532 | B2 | 8/2002 | Goldband et al. |
| 6,469,991 | B1 | 10/2002 | Chuah |
| 6,496,482 | B1 | 12/2002 | Kubota |
| 6,620,043 | B1 * | 9/2003 | Haseltine et al. ................. 463/7 |
| 6,707,820 | B1 | 3/2004 | Arndt et al. |
| 6,745,224 | B1 | 6/2004 | D'Souza et al. |
| 6,755,743 | B1 | 6/2004 | Yamashita et al. |
| 6,917,975 | B2 | 7/2005 | Griffin et al. |
| 6,961,318 | B2 | 11/2005 | Fichou et al. |
| 6,999,083 | B2 | 2/2006 | Wong et al. |
| 7,002,926 | B1 | 2/2006 | Eneboe et al. |
| 7,020,654 | B1 | 3/2006 | Najmi |
| 7,065,041 | B2 | 6/2006 | Sen |
| 7,148,895 | B2 | 12/2006 | Konishi et al. |
| 7,373,377 | B2 * | 5/2008 | Altieri ........................... 709/203 |
| 2002/0124053 | A1 | 9/2002 | Adams et al. |
| 2002/0183115 | A1 | 12/2002 | Takahashi et al. |
| 2003/0038805 | A1 | 2/2003 | Wong et al. |
| 2003/0105734 | A1 | 6/2003 | Hitchen et al. |
| 2003/0220143 | A1 * | 11/2003 | Shteyn et al. ..................... 463/42 |
| 2003/0229623 | A1 | 12/2003 | Chang et al. |
| 2004/0049537 | A1 | 3/2004 | Titmuss |
| 2004/0076160 | A1 | 4/2004 | Phaltankar |
| 2004/0098456 | A1 | 5/2004 | Krzyzanowski et al. |
| 2004/0171381 | A1 * | 9/2004 | Inselberg ................... 455/426.2 |
| 2004/0193441 | A1 * | 9/2004 | Altieri ............................... 705/1 |
| 2005/0033669 | A1 | 2/2005 | Stremler et al. |
| 2005/0138419 | A1 | 6/2005 | Gupta et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0041606 | A1 | 2/2006 | Sawdon |
| 2006/0048224 | A1 | 3/2006 | Duncan et al. |
| 2006/0058103 | A1 | 3/2006 | Danieli et al. |
| 2006/0062161 | A1 | 3/2006 | Tang et al. |
| 2006/0123005 | A1 | 6/2006 | Burnett et al. |
| 2007/0050715 | A1 * | 3/2007 | Behar ........................... 715/706 |
| 2007/0115123 | A1 | 5/2007 | Roberts et al. |
| 2007/0136572 | A1 | 6/2007 | Chen et al. |
| 2008/0125226 | A1 | 5/2008 | Emmerson |

FOREIGN PATENT DOCUMENTS

| | | |
|---|---|---|
| EP | 1058429 A1 | 12/2000 |
| EP | 1376309 | 1/2004 |
| EP | 1524580 A2 | 4/2005 |
| EP | 1564622 | 8/2005 |
| GB | 2409417 A | 6/2005 |
| JP | 2001282634 A | 10/2001 |
| KR | 1020040038271 A | 5/2004 |
| KR | 1020040107152 A1 | 12/2004 |
| KR | 1020060057563 A1 | 5/2006 |
| WO | WO9846029 | 10/1998 |
| WO | WO 0008814 A1 | 2/2000 |
| WO | WO0175545 | 10/2001 |
| WO | WO 2004002107 A1 | 12/2003 |
| WO | 2005022826 | 10/2006 |

OTHER PUBLICATIONS

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf&identifier=oai:arXiv.org:cs/0502091. Last accessed Sep. 20, 2006.

International Search Report and Written Opinion for PCT Patent Application PCT/US2007/079610, completed Nov. 14, 2008 and mailed Nov. 18, 2008, 13 pages.

International Search Report for PCT Application No. US2007/079598 dated Jan. 30, 2008, 10 pages.

International Search Report for PCT Application No. US2007/079606 dated Feb. 27, 2008, 10 pages.

Callaham, "Valve's Multicast Tech Interview", retrieved on Mar. 7, 2006 at <<https://mail.internet2.edu/wws/arc/wg-multi-cast/2001-04/msg00015.html>> Apr. 13, 2001, 2 pages.

Cohen, "The Virtual Cinematographer: A Paradigm for Automatic Real-Time Camera Control and Directing", retrieved May 2, 2006 at <<http://research.microsoft.com/research/pubs/view.aspx?pubid=145>>, Jan. 1996, 1 page.

Drucker, "Intelligent Camera Control for Graphical Environments", MIT Media Lab, Apr. 29, 1994, 207 pages.

GameSpy, "Multicast Spectator Tech for Half-Life", retrieved on Mar. 7, 2006 at <<http://archive.gamespy.com/articles/june01/hlmod3b/>>, 5 pages.

Gibstats, retrieved at http://www.planetquake.com/gibstats/index.html>>, Dec. 14, 2000, 27 pages.

Gibstats—Welcome, retrieved Mar. 7, 2006 at <<http://gibstats/planetquake.gamespy.com/index.html>>, May 12, 2000, 1 page.

International Search Report for PCT Application No. US 2007/079598, dated Jan. 30, 2008, 10 pages.

Otten, "Broadcasting Virtual Games in the Internet", Jun. 2001, 11 pages.

"Pervasive Gaming Goes Mainstream", retrieved on May 22, 2006 at <<http://marketresearch.com/product/display.asp?productid=275, Aug. 2000, 3 pages.

"Valve's Multicast Tech Interview", retrieved on May 2, 2006 at <<http://www.ukterrorist.com/news/317/>>, Apr. 13, 2001, 2 pages.

Vronay, et al., "Streaming Media Interfaces for Chat", Virtual World Group, Microsoft Research, Apr. 1999, 7 pages.

* cited by examiner

VIRTUAL ENTERTAINMENT

BACKGROUND

Advancement of technology in the world of communications and computing has significantly advanced entertainment systems and enhanced user experiences. In general, entertainment systems strive to realistically recast an environment in which an event or game action occurs. Such trend can also involve recreating the environment based on a user's expectations or desires. Moreover, recent advancements in processing power and transmission capability have made it possible to recreate a realistic setting in relatively small computer enabled systems.

Typically, the entertainment industry offers a variety of passive and interactive forms of settings for amusements, which often are tailored depending on target audience. For example, different video games and television events or programs are specifically marketed to specific life styles, target age groups, and the like. Similarly, head mounted computer displays enable users to experience a graphical environment, wherein a user can enjoy an illusion of presence in the displayed environment. In general, such software for generating virtual reality environments have typically been employed for training and entertaining of personnel, wherein relatively inexpensive computing devices enable 3D virtual reality user interfaces. These 3D virtual reality worlds allow a user to explore a simulated environment. Such environments can further include views from an ordinary street scene with walkways, roads, and buildings to a completely fictitious landscape of an outer space planet. In general, the end goal with virtual reality interfaces still remains to provide the user the most realistic experience possible.

Moreover, there exists a tendency for computer games to emulate television programs, and there often is significant crossover between video games and television. For example, some computer video games are based on television programs, and other computer games subsequently become the subject of television programs or full-length feature movies. Despite similarities, there is little interaction between the video games and associated television programs. Typically, a user is either a participant of the video game, or a passive viewer of a television program or movie.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for systems and methods that supply immersive entertainment, and create a sensation for a user(s) that is similar to having guests (who are in remote locations), to be presented as virtual guests to the user during performance of an event (e.g., a live sporting event, spectator game, television shows, games and the like)—via employing a presentation system and a virtual reality generation component. Such virtual reality generation component emulates activities of virtual guests (e.g., implement holographic avatars via a plurality of communication interfaces to imitate actions of virtual guests, and/or accepts functions provided to transform the activities, and the like). The presentation system can present such activities to the user, (e.g., activities of the virtual guest can be viewed, heard, felt, or otherwise presented to the senses of the user.) In addition, transform functions for activities can be supplied dynamically (e.g., based on type of virtual events)—for example transformation functions applied to virtual guests enable creation of a variety of scenarios (e.g., change of avatar representation, appearance of the virtual guest and the like.)

Although guests are only present virtually (e.g., electronically present with other objects/user within the environment), the user and guests can concurrently experience the event together—such that the user can feel actual presence of guests in the same environment (e.g., full duplex communication while experiencing the event, visual prompts exchange with virtual guest, shared emotions, other data exchange and the like.) For example, guests who have accepted the virtual invitation from remote locations can control their virtual presence thru avatars that represent them, e.g., through a combination of input mechanisms, such as: hand held input devices. Moreover, such guests can wear a tracking system of body motion, to control their virtual presence thru avatars that represent them, (e.g., data generated from electronic and electromagnetic tracking components can monitor bodily movement, and transfer such movements to a respective avatar and/or holographic virtual representation). Accordingly, the subject innovation supplies a platform to include a set of experiences, which are supplemented with continuous capturing of data and images (e.g., live video, continuous motion), to encompass information about the event/virtual guests, and to further allow such information to be accessible to a user on demand.

Additionally, users can also customize the entertainment or interaction with virtual guests by selection of a viewing angle, speed, re-plays and the like. A background isolation component can operate in conjunction with the entertainment system, to filter unwanted distractions. Accordingly, a dynamic multi-way communication channel can be established among the guests, users, and the event/show itself. Moreover, the interaction of the guests and users with each other can also determine manner of presentation for the show, e.g., close up scenes to be emphasized, censured, and the like.

Another aspect of the subject innovation provides for an infrastructure or portal (e.g., a Website) to access spectator related services. The portal can supply information about the occurrence of one or more live sporting games, live concerts, shows that are capable of viewing by the users and guests or other events. For example, the portal can include a user interface, which presents information about available event occurrences, to a user. The user can then decide to enjoy such event with virtual guests. The available events can correspond to real time or to delayed versions of the events, and can include visual and/or audio information about the available event occurrences; such as: identifying the name for each event, the number of active participants, the number of spectators, and the like. The portal can further include user interface elements that can be activated to connect to a spectator experience corresponding to a desired occurrence of a game or event.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
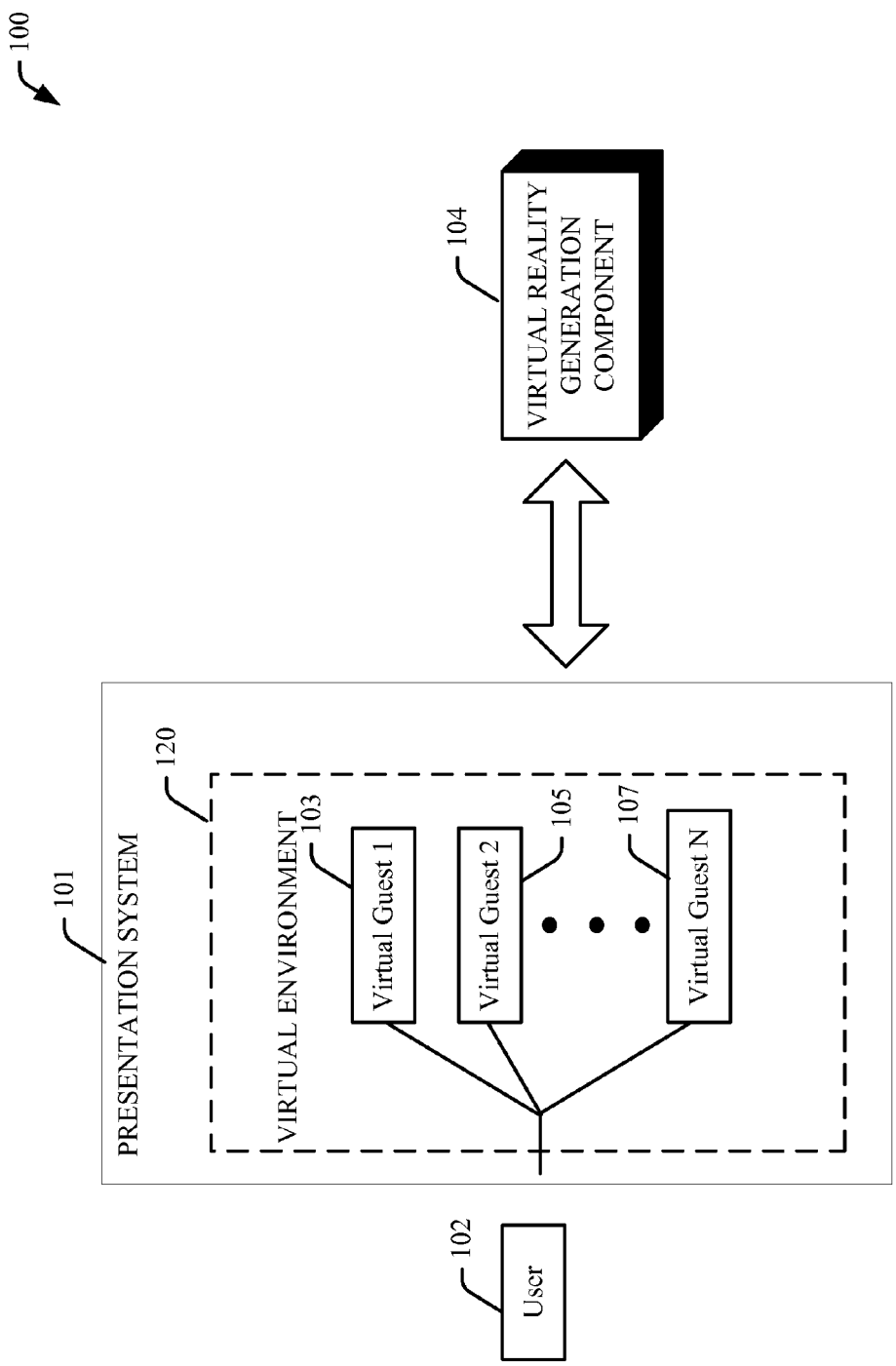
FIG. 1 illustrates a block diagram of an exemplary system that enables a user to create a sensation similar to having guests in a remote location to be physically present as virtual guests.

FIG. 1 illustrates a system 100 for a virtual reality entertainment system that supplies immersive entertainment, and creates a sensation for a user similar to having guests—which are actually in a remote location—to be physically present as virtual guests, via employing a presentation system 101 and a virtual reality generation component 104. Such virtual reality component 104 emulates activities of virtual guests (e.g., implement holographic avatars via a plurality of communication interfaces to imitate actions of virtual guests, accept functions to transform the activities), and the presentation system 101 can present such activities to the user, (e.g., activities of the virtual guest can be viewed, heard, felt, smelled or otherwise presented to the senses of the user.) Moreover, the presentation system 101 can employ a personal computer, a projection unit, a system including 3D goggles and headphones, or a simulator providing visual, audible, and physical stimulation, and the like, to present activities of the virtual guest to the user. Accordingly, the presentation system 101 can process information and output data, such that it can be viewed, heard, felt, or otherwise presented to the senses of the user. For example, through the presentation system 101, the user 102 is able to experience presence of virtual guests 103,105 and 107 (1 thru N, N being an integer). It is to be appreciated that the virtual environment 120 itself can also be considered part of the virtual representation system 101. Moreover, interaction of the user 102 with virtual guests can be in form of audio, video, text messaging, holographic avatar and the like. Furthermore, transformation functions can be applied (e.g., dynamically and based on type of virtual events), to enable creation of a variety of scenarios (e.g., change of avatar representation, appearance and the like.) For instance, in the case of a sports game event that has a plurality of virtual guest—who are represented by avatars to represent a stadium setting—transform functions can be applied to represent some virtual guests who are fans as tiny wisps to one user, and yet render such virtual guests as dragons to another user.

Moreover, the virtual reality component can implement holographic avatars, via a plurality of communication interfaces, to imitate a relationship between the user and the virtual guests/surrounding environment. Guests who have accepted the virtual invitation, and hence represented as virtual guests 103, 105, and 107 can control their virtual presence thru avatars that represent them, from remote locations; e.g., through a combination of input mechanisms, such as for example: hand held input devices and data generated from electronic and electromagnetic tracking devices that monitor bodily movement, as described in detail infra. Although virtual guests 103, 105, and 107 are only present virtually (e.g., electronically present with other objects/user within the environment), such virtual invitation enables a user and guests to concurrently experience the entertainment together (e.g., exchange of emotions during a live sporting event or spectator game; visual prompts exchange with virtual guest, other data exchange and the like.)

Figure 2:
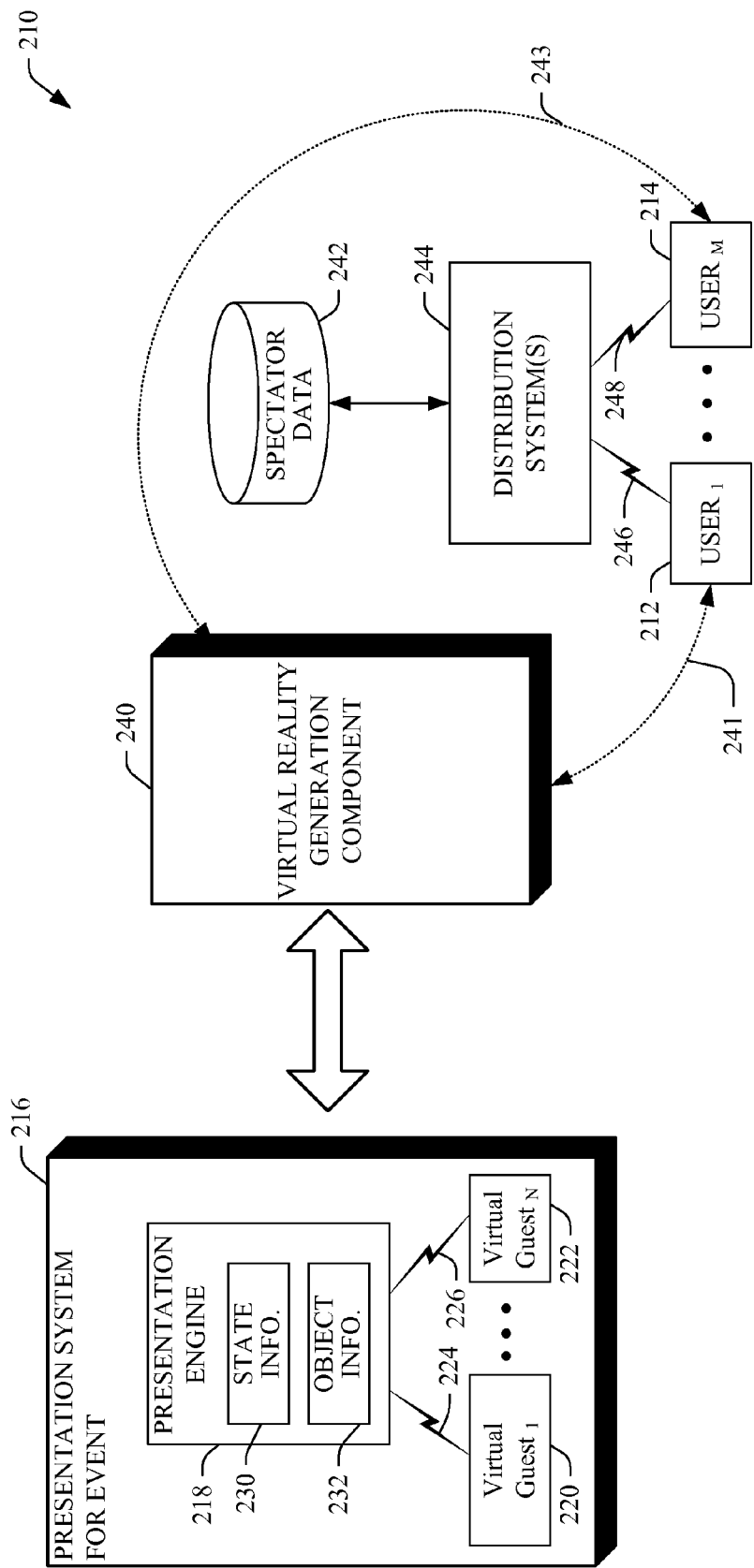
FIG. 2 illustrates a block diagram for a system with a virtual reality generation component in accordance with an aspect of the subject innovation.

FIG. 2 illustrates a block diagram of a system 200 that creates a sensation for a user(s) similar to having guests in a remote location to be physically present as virtual guests, and vice versa (e.g., an asymmetrical relation can exist between users and guests). The system 210 provides a spectator experience to one or more users 212, 214 (User$_1$ through User$_M$, where M is an integer) in accordance with an aspect of the subject innovation. The system 210 can operate in conjunction with an occurrence of an event (e.g., a sporting game), to be enjoyed by a plurality of users in presence of a plurality of virtual guests 220 to 222 (1 thru N, where N is an integer). It is to be appreciated that the subject innovation can be employed in conjunction with television shows, news, broadcasts, computer games, group meetings, and the like. In addition, the presentation system for event 216 can include a live, real time occurrence and/or can be based on stored data for a previous occurrence thereof. Moreover, the presentation system for event 216 can further include a presentation engine 218, with which one or more users 220 and 222 (being live persons) can interact with virtual guests 220, 222 (1 thru N, N being an integer).

According to a further aspect of the subject innovation, the presentation engine 218 can be implemented as a process running at one or more computers programmed to facilitate interaction between users 212 and 214 and virtual guests 220 and 222 during the presentation system event 216. The virtual guests 220 and 222 can be coupled to the presentation engine 218 through respective communication links 224 and 226. Such links 224, 226 can be direct or indirect connections, such as through one or more proxy servers. A virtual guest 220, 222 can provide instructions to the presentation engine 218 regarding manner of interaction with the users 212, 214 during the event.

Such instructions affect overall experience of the users 212, 214 with the virtual guests 220, 222 and also other attributes of experiencing the event, e.g., ranking comments from virtual guests based on predetermined thresholds, replay of scenes from the event based on demographics of virtual guests (who is a fan of which team), viewing angles, and the like. The presentation engine 218 can include one or more interfaces that expose methods and/or functions associated with the event to be experienced simultaneously by the users and virtual guests. Such interfaces enable users 212, 214 and virtual guests 220, 222 to communicate therebetween, e.g., by a corresponding process running on the virtual reality generation component 240 that facilitates communication of data between the virtual guests 220, 222 and the users 212, 214.

According to a particular aspect of the subject innovation, the presentation engine 218 can include state information 230 and object information 232, wherein the state information 230 can relate to parameters with values that define status and relationship of the users 212, 214 and virtual guests 220, 222 relative to an event that is shared and/or experienced therebetween. For example, state information 230 can pertain to which users and virtual guest admire a same player or share a common game strategy about a playing event. Such state information 230 can continually update as a function of time, in response to instructions received (and/or the absence of instructions) from the users 212, 214 and/or virtual guests, 220, 222. The state information 230 can further encompass a time stamp to facilitate synchronization of event data for respective users 212, 214 and virtual guests 220, 222. The state information 230, can further include event time, position or condition of the virtual guests 220 and 222 (e.g., who is fan of which team), historical or biographical information, and the like.

Likewise, the object information 232 can provide information about interaction of virtual guests 220, 222 with users 212, 214 and the event. The object data can identify the nature of communication (e.g., message exchange, holographic presentation, audio, desired manner of interacting within the users or event, and the like). The object information 232 and/or the state information 230 can be transceived with each virtual guest 220, 222 to facilitate rendering an animated representation thereof with each user 212, 214. Corresponding information can also be generated for each user 221, 214 based on the state information 230 and object information 232 and data provided by such users (e.g., who is a fan of which team, blockage of some virtual guests, and the like.)

The virtual reality generation component 240 can include a process running on one or more computers (e.g., a server) that operatively communicates with the presentation system 218, for example. Moreover, the virtual reality generation component 240 can receive information indicative of the occurrence of an event, based on which it can generate spectator data 242, such as type of representation for virtual gusts to the user 212, 214. In particular, one or more distribution systems 244 can employ the spectator data to, in turn, distribute (or broadcast) a corresponding signal to the users 212, 214. The users 212, 214 can interact with the virtual reality generation component 240, and receive the distributed spectator information from associated distribution system 244, via communication links 241, 243, 246 and 248 respectively. Such communications links can be direct connections, such as wired (e.g., optical or electrically conductive) or wireless connections, or indirect connections through one or more proxies, and unidirectional or bi-directional communications channel, for example.

Figure 3:
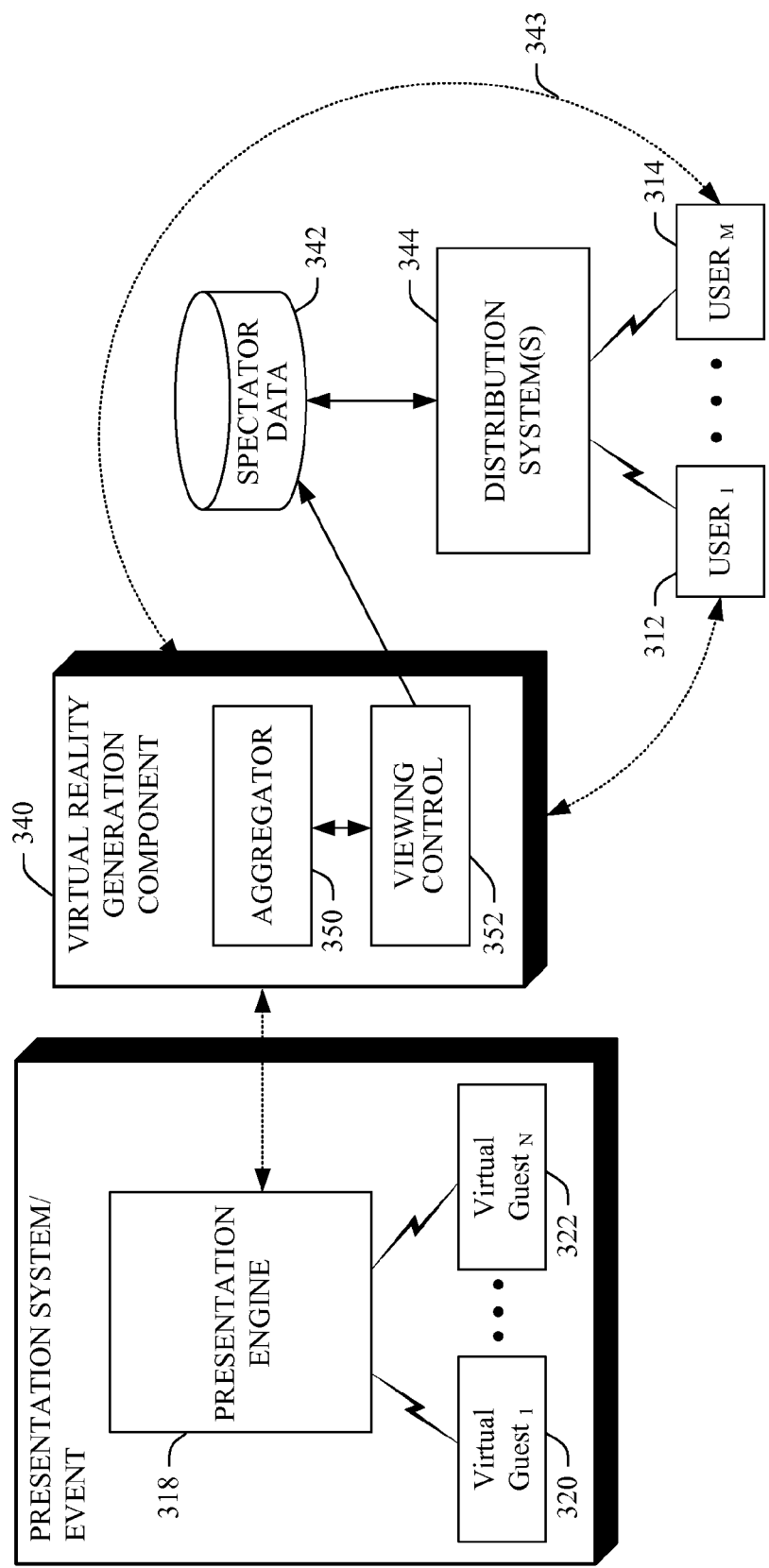
FIG. 3 illustrates a generation component with an aggregator that receives the state information and object information from a presentation engine in accordance with an aspect of the subject innovation.

In a related aspect and as illustrated in FIG. 3, the virtual reality generation component 340 can include an aggregator 350 that receives the state information and object information from the presentation engine 318. As discussed supra, the state information and object information can collectively indicate who the virtual guests are, condition of the event and users, and other attributes associated with occurrence of the event, whereby the virtual reality generation component 340 can subsequently provide the spectator data 342, based on state information, object information and other preferences as indicated by the users and/or virtual guests.

A viewing control component 352 can be coupled to the aggregator 350 to receive aggregated state and object data. The viewing control 352 can process the aggregated data to provide enhanced spectator data, related to interaction of the virtual guests and/or users (e.g., simulate presence of the guest in an environment of the user during performance of the event.) In a related aspect, the viewing control 352 can implement virtual camera control in which a plurality of virtual cameras are utilized to provide cinematic features, such as for example to provide users with desirable viewing angles of virtual guests and/or events. For example, a virtual cameral control can automatically select virtual cameras based on preprogrammed cinematographic algorithms, or manually based on instructions from an authorized person or user (e.g., a human director).

In addition, users 312, 314 can employ virtual camera control to select a desired viewpoint to observe occurrence of the event and/or interaction with virtual guests. For example, a user can select to move between different virtual guests, to couple the virtual camera with one or more participants of the event, or implement an automatic camera control based on designated spectator preferences.

The virtual camera of the viewing control 352 also can be coupled with a guest, such as to follow that guest's activities during the event. The viewing control 352 further can dampen motion/interaction of the virtual guests in the representation provided to the spectators 312 and 314.

The virtual reality generation component 340 also can provide a representation of interaction of virtual guests 320, 322 with the spectator data 342; for example, presenting an indication (e.g., audio and/or visual) of virtual guests interaction with the event, such as applauding, cheering and the like. Moreover, virtual guest can be associated with each other, e.g., through a messaging service to enable communication between such virtual guests, (aside from connection with the users during the event.) Accordingly, the users can "feel" presence of the virtual guest during the event (e.g., have side conversations, observe reaction through visual holographs, and the like.) Hence, both the users and the virtual guests can implement features that cause such virtual guests/users to be aware of each other.

It is to be appreciated that numerous possible architectures exist, wherein the system 310 can be implemented in accordance with various aspects of the subject innovation. For example, such architecture and implementation therein can be driven by bandwidth considerations associated with the communication links by which the users 312, 314 interact with virtual guests 320 and 322 to receive and/or transmit information. By way of illustration, in a high bandwidth environment, the entire spectator experience including graphical and/or audio elements can be rendered from the spectator data 342 and then be transmitted over the distribution system(s) 344 to the users 312 and 314. In other circumstances, partial rendering (e.g., for interaction of users) can occur at the virtual reality generation component 340 (e.g., and prior to transmission from the distribution system 344). Likewise, in low bandwidth environments, it can be desirable to store most of the logic and graphical elements operative to generate the interaction environment at the side of users 312 and 314 (e.g., in CD ROM, DVD, hard disk drive, and the like), such that appropriate graphical and/or audio data can be accessed from such stored data to more rapidly create the spectator experience based on the spectator data. The users 312, 314 and guests represented by virtual guests 320, 322 can further employ consoles, such as are operative to connect to the Internet or other communication frameworks. As explained earlier, the system 310 can include televisions that receive the spectator experience as conventional broadcast data (e.g., broadband cable, digital cable, satellite, streaming, and the like). It is to be appreciated that the system 310 can employ more that one communications infrastructure to communicate data that creates the spectator experience, and users can control type of sense(s) to be engaged (e.g., selecting audio interaction with virtual guests, while not choosing scent of virtual guest during such interaction). Moreover, virtual partitions can be provided, which restrict access to some users and not others (e.g., private interaction rooms, chat rooms, and the like.)

Figure 4:
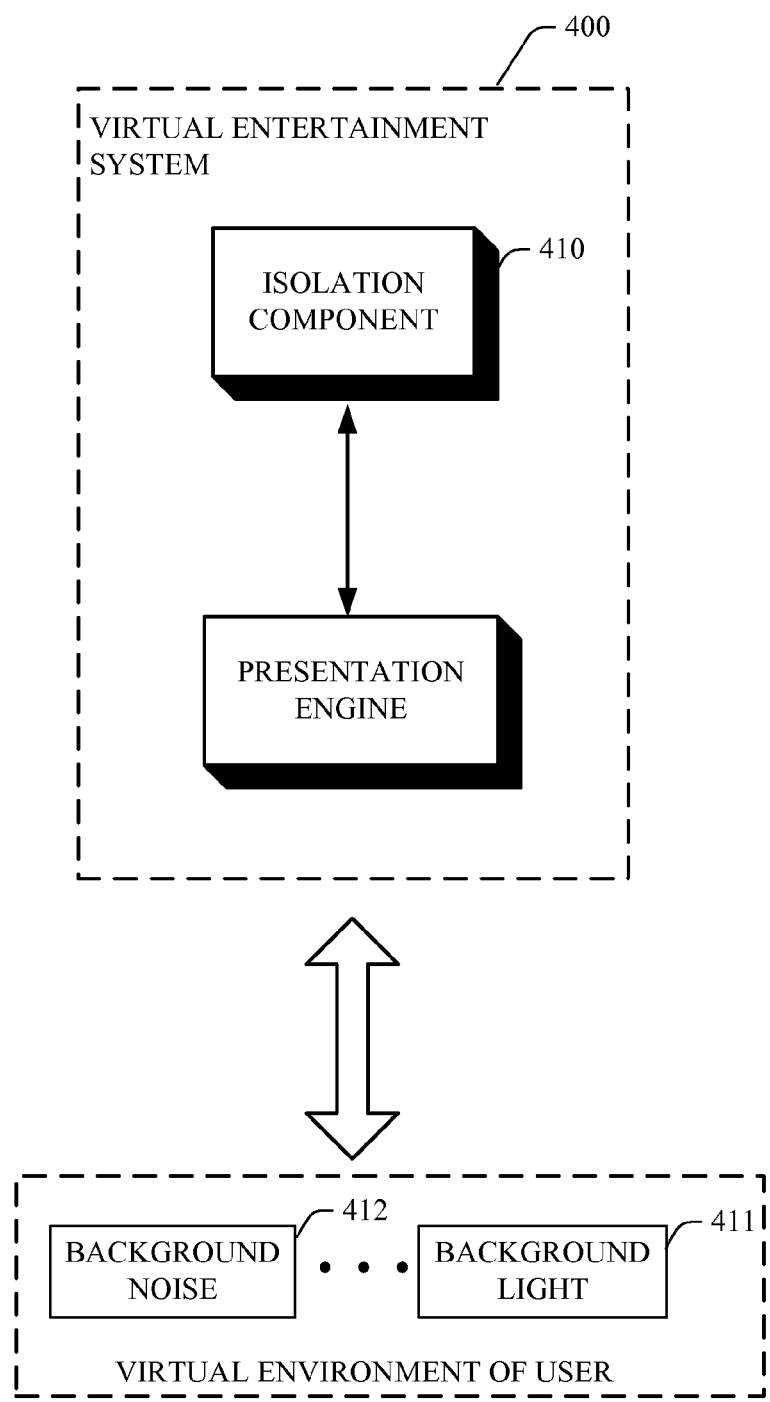
FIG. 4 illustrates a particular aspect of the subject innovation, wherein the virtual entertainment system employs an isolation component.

FIG. 4 illustrates a particular aspect, wherein the virtual entertainment system 400 of the subject innovation, employs an isolation component 410. Such isolation component operates in conjunction with the entertainment system, to filter unwanted background distractions (e.g., 411, 412) at the user's environment. For example, a noise filter can be implemented as part of the isolation component to filter out unwanted background noise. Additionally, users can also customize the entertainment/performance by selection of a viewing angle, speed, re-plays and the like. Accordingly, a dynamic multi-way communication channel can be established among the guests, users, and the show itself. Moreover, the interaction of the guests and users with each other can also determine manner of presentation for the show type, e.g., close up scenes to be emphasized, censured, and the like.

Figure 5:
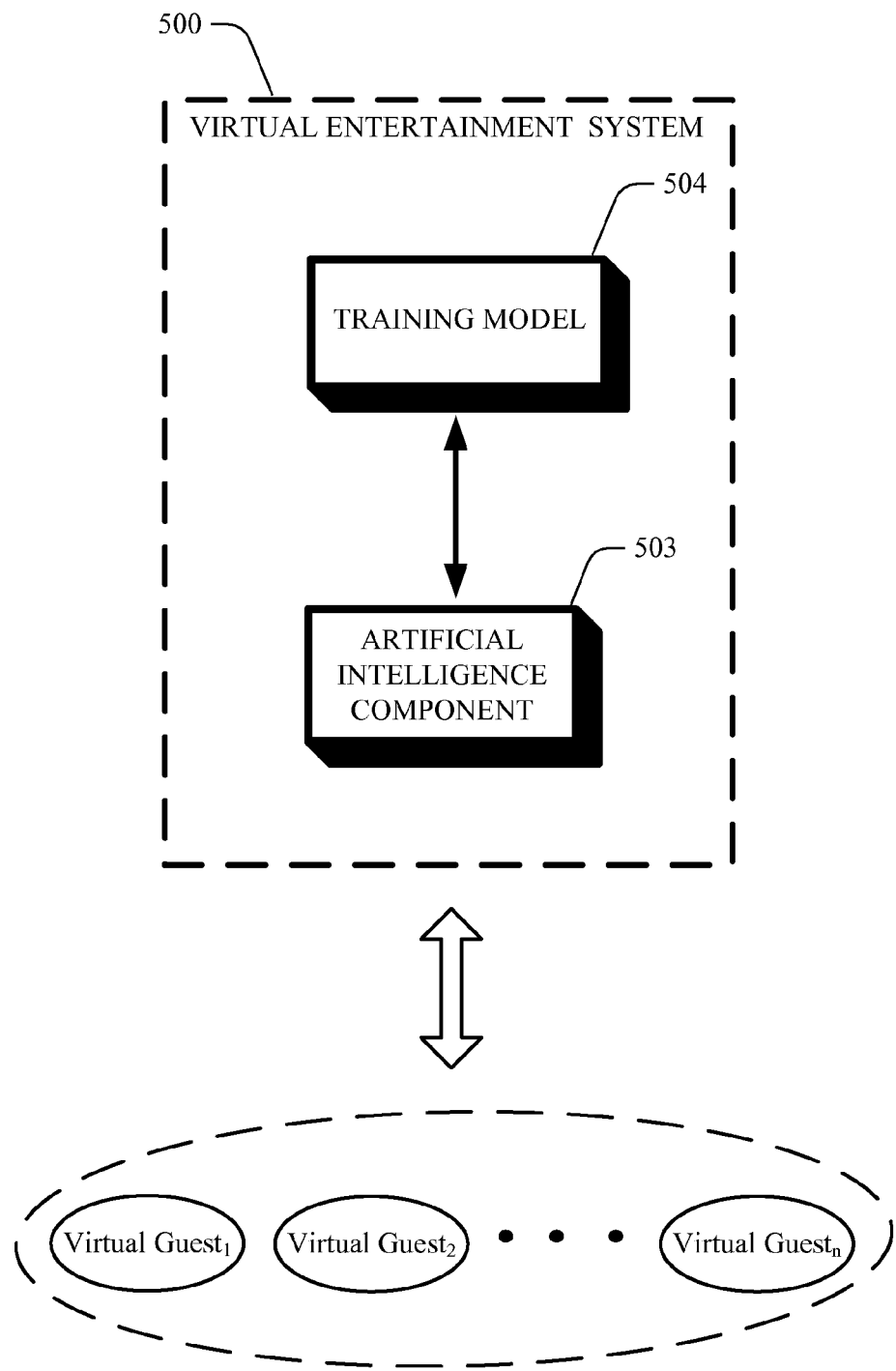
FIG. 5 illustrates a virtual entertainment system that incorporates an artificial intelligence component, in accordance with an aspect of the subject innovation.

FIG. 5 illustrates a virtual entertainment system 500 that incorporates an artificial intelligence component 503 in conjunction with a training model 504, in accordance with an aspect of the subject innovation. For example, a process for enhancing experiences between a user and virtual guests can be facilitated (e.g., supplementation of data images, connection between users and virtual guests) via an automatic classifier system and process. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data model 504) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., prior event interactions between virtual guest and users), and at what type of event to implement tighter criteria controls (e.g., live sporting event versus a pre-recorded television show).

Artificial intelligence based systems (e.g., explicitly and/or implicitly training model 504) can be employed in connection with performing inference and/or probabilistic determinations and/or statistical-based determinations as in accordance with one or more aspects of the systems and methods as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject systems and methods.

Figure 6:
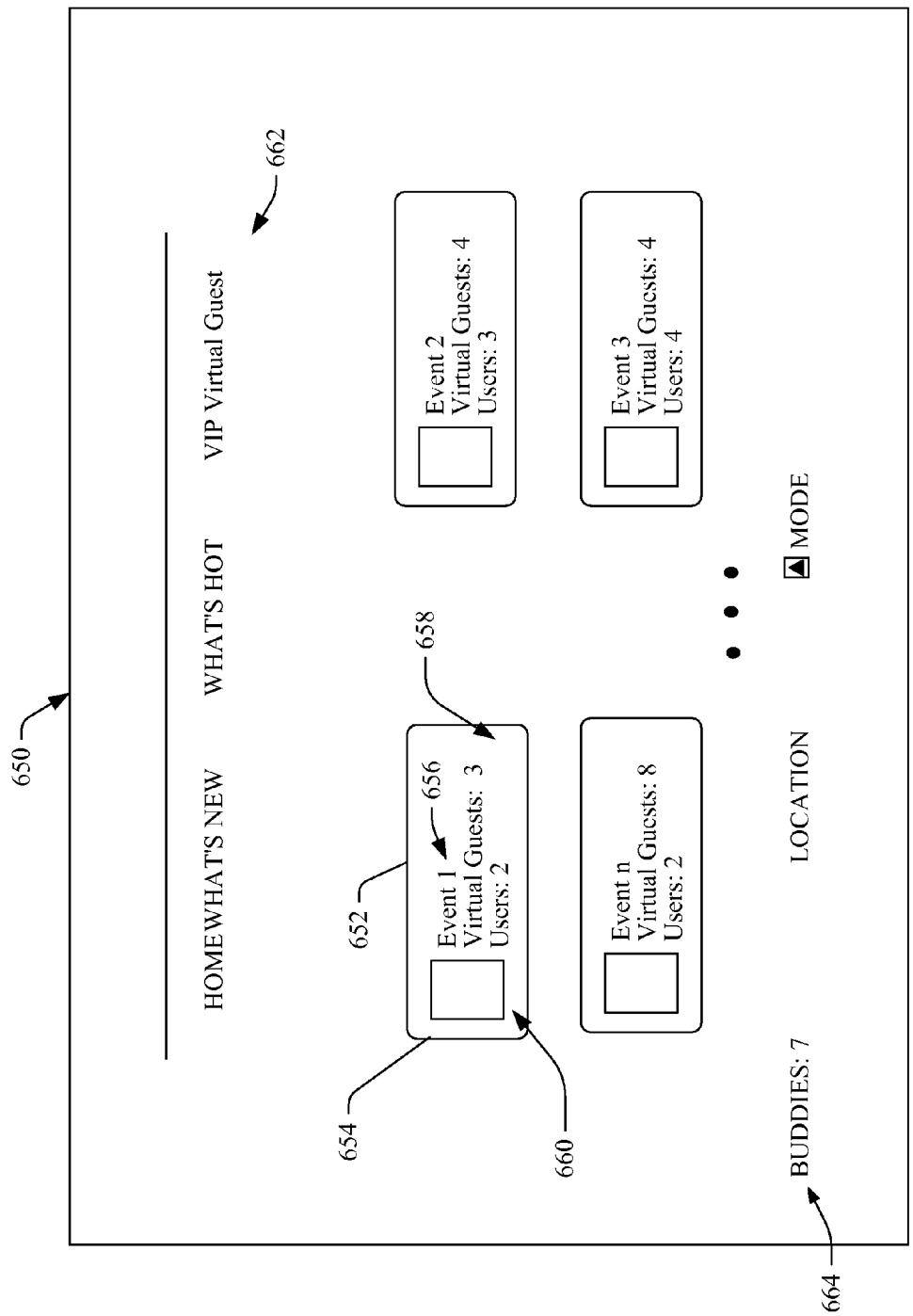
FIG. 6 illustrates an example of a graphical user interface for a portal in accordance with an aspect of the subject innovation.

Referring to FIG. 6, an example of a graphical user interface 650 for a portal is illustrated, in accordance with an aspect of the subject innovation. As mentioned, the portal may be implemented at a Website that collects information from and spectator experiences associated with the event. The interface 650 can include a plurality of user interface elements 652, each associated with a different event. That is, more than one occurrence of an event can exist concurrently. For example, each user interface element 652 can present a variety of information about occurrence of the associated event, including an image 654 for the event that is to be enjoyed by the user and virtual guests, the name of the event 656, the number of virtual guests 658, and the number of users that require interaction with virtual guests. Each item related to such information further can be implemented as a user interface element, which, upon being activated, presents additional related information. For example, by selecting the image element 654, highlights of the current event can be presented to the virtual guest/user, such as by streaming or other communication protocols. The virtual guest interface element 658 can be activated to provide information about the users/virtual guests, such as player statistics, highlights for such players from the present and/or previous events, and the like The interface 650 also can include user interface elements or links to other related websites and/or services. By way of example, the interface can include selectable buttons or links, generally indicated at 662, which include: a link to the service provides homepage (HOME); an interactive of list of new events and/or games for which new spectator services are available (WHAT'S NEW); an interactive list of events such as television shows that have a substantially large group of audiences such as based on various ratings provided by critics and/or number of virtual guests that have indicated interest in participating in events (WHAT'S HOT); and an interactive list for VIP virtual guests as indicated by a user—(VIP virtual guest). The interactive list of guests, for example, can provide links to Web pages that contain more detailed information about each virtual guest, such as statistical information, biographical information, fan clubs and the like.

The illustrated interface 650 can also include a BUDDIES user interface element 664 that provides information indicative of additional users and/or other user preferred virtual guests logged on as spectators that are linked or associated with the user of the interface, such as by identifying characteristics shared between two or more users (e.g., through an instant messaging service). The BUDDIES interface element 664, for example, is a button or link that accesses another Web page or service operative to provide additional information about the user's associates and/or virtual guests. Such information can include a representation of the associate (e.g., graphical and/or textual) as well as each associate's location, namely, an indication of which game(s) the associate is a spectator.

Figure 7:
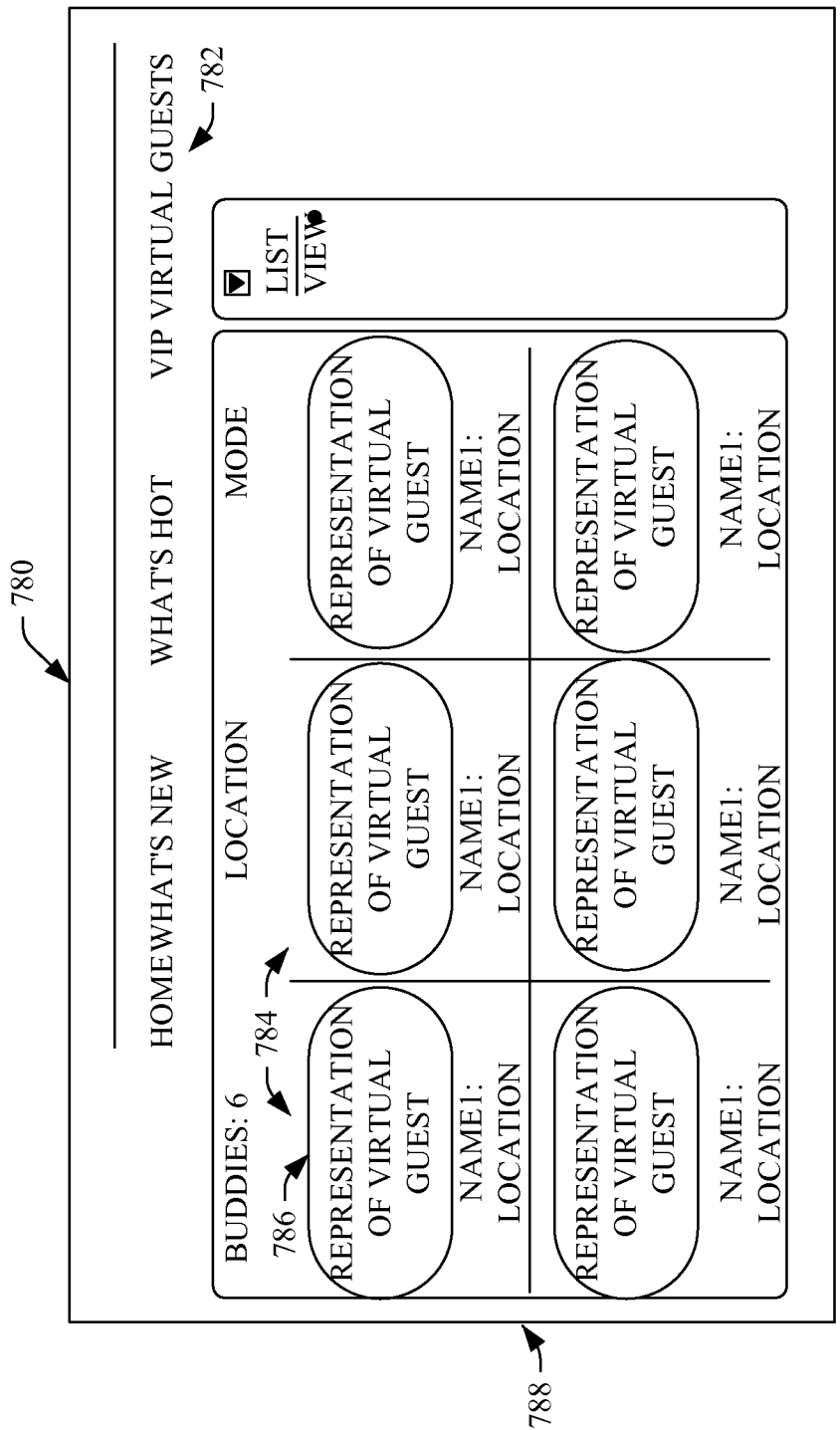
FIG. 7 illustrates a particular graphical user interface that provides information about user(s) in accordance with an aspect of the subject innovation.

FIG. 7 illustrates a particular graphical user interface 780 that provides information about a user's associates (e.g., other users who are actually physically present) and/or virtual guests in accordance with an aspect of the subject innovation. The interface 780 can include selectable buttons or hypertext links 782, (e.g., HOME, WHAT'S NEW, WHAT'S HOT, and VIP Virtual Guests), such as described above with respect to FIG. 6. The interface 780 also can include user interface elements 784 for each virtual guest and/or user that interact during an event. For example, a user interface element 784 can include a representation interface element 786 of the respective associate. The representation element 786 can include a holographic, graphical and/or textual representation of the associate as well as provide a link to the location(s) (e.g., URL(s)) where the virtual guest is located. The interface elements 784 also include a location interface element 788 corresponding to the location of the virtual guests. The location interface element 788 can identify which event the virtual guest is a spectator of as well as provide a link to the spectator experience (and location therein) where that guest is located. Thus, by activating or selecting one of the interface elements 786, 788, a user can access the spectator experience in which the virtual guest already is invited.

Figure 8:
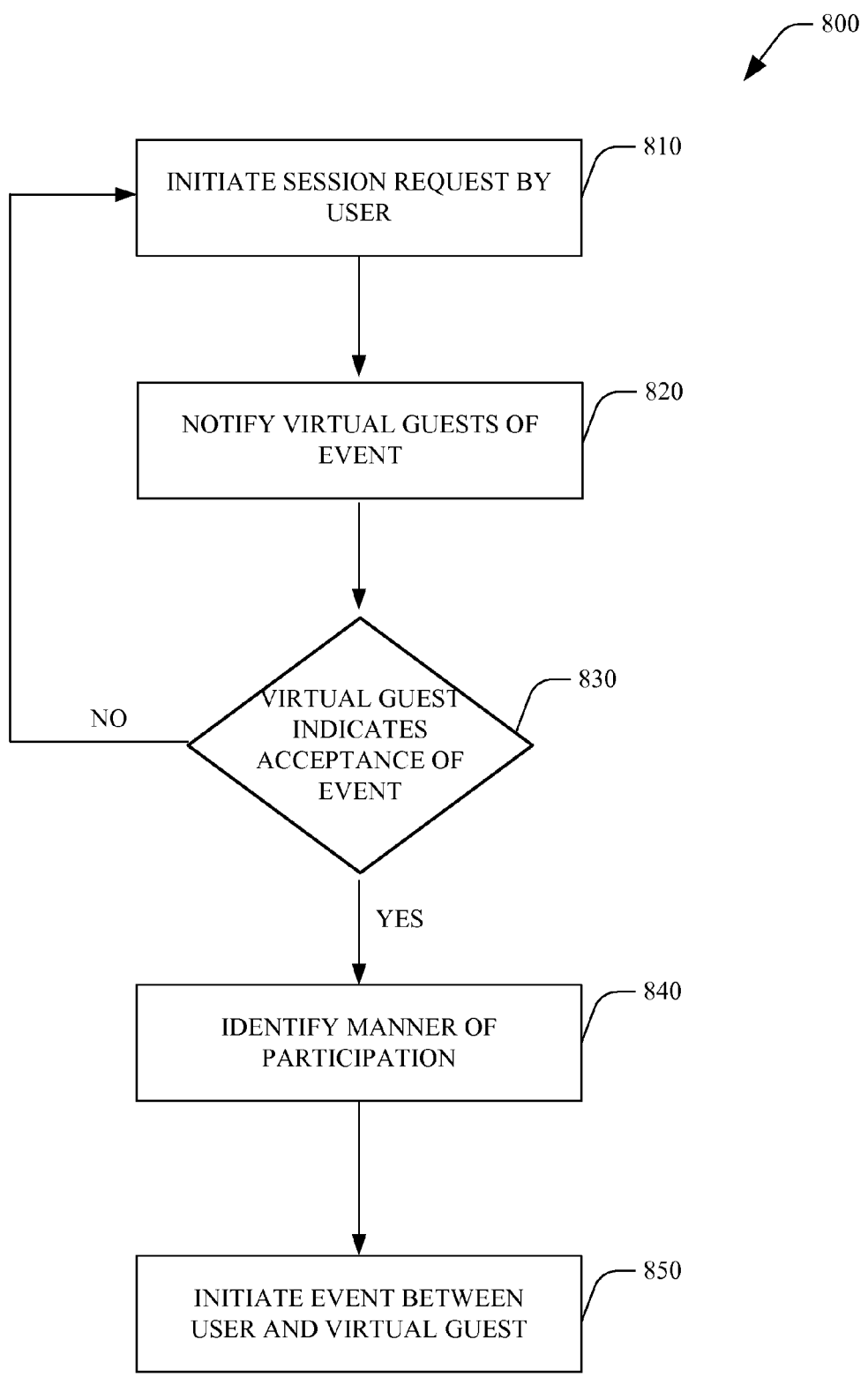
FIG. 8 illustrates a particular methodology of concurrently experiencing an event by users and virtual guests in accordance with an aspect of the subject innovation.

FIG. 8 illustrates a particular methodology of concurrently experiencing an event by users and virtual guest in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. A user who wishes to concurrently experience entertainment with a plurality of guests, initially can initiate a session request and at 810. Next, and at 820 guests can be notified of such event (e.g., via a mailing list, predetermined order and the like.) Subsequently, guests who are interested in virtually participating in such session can indicate their acceptance to the user at 830. Next and upon acceptance at 840, a desired form of participation (e.g., audio conferencing, video conferencing, chat room computer icons that identify a user, holographic representation of a guest, and the like) can be identified by the user/virtual guest. At 850 an event between user and virtual guest can be initiated, wherein the user feels presence of virtual guests (e.g., simulate presence of the guest in an environment of the user during performance of the event.

Figure 9:
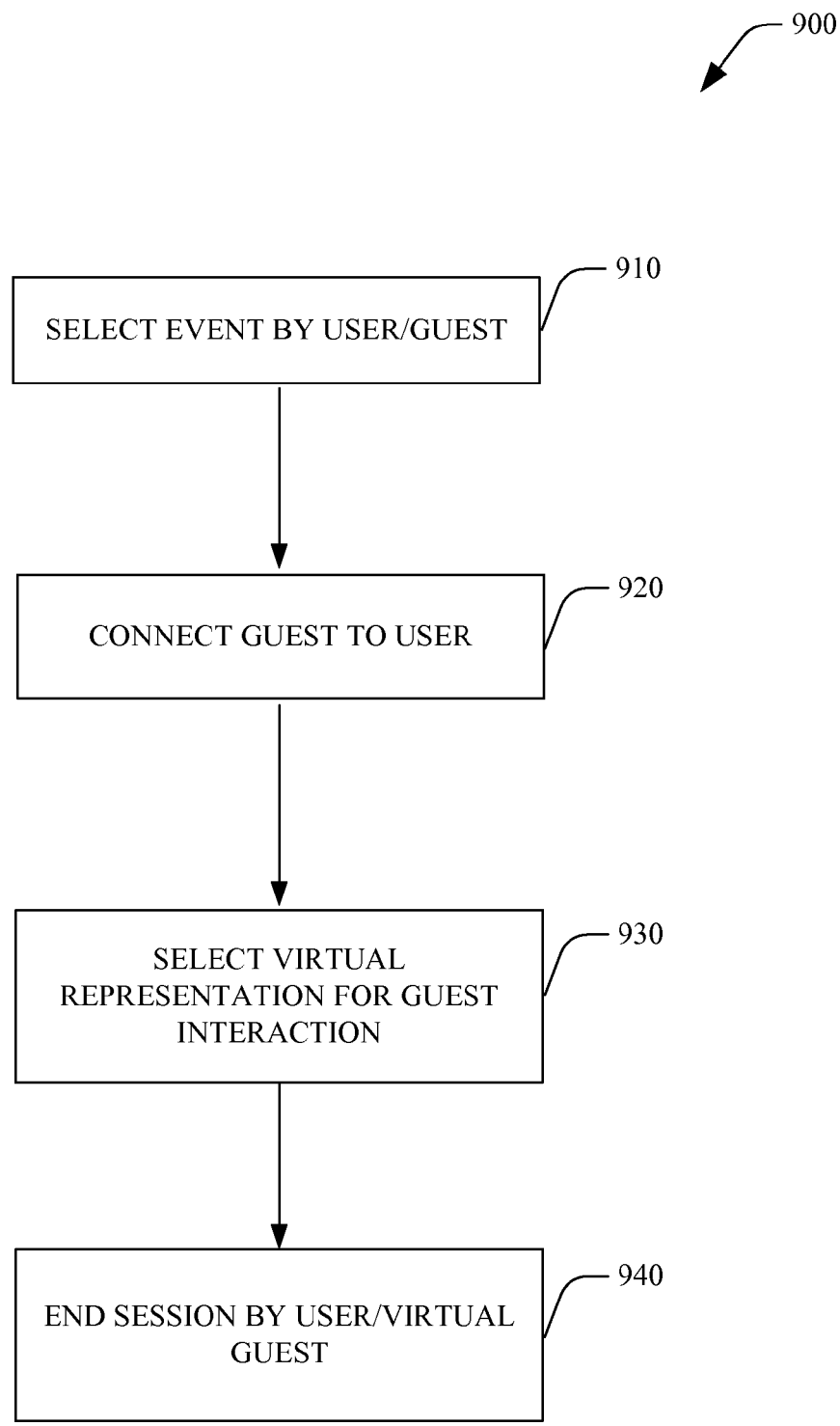
FIG. 9 illustrates a particular methodology of user/virtual guest interaction, according to an exemplary aspect of the subject innovation.

FIG. 9 illustrates a particular methodology in accordance with an aspect of the subject innovation. Initially and at 910 an event can be selected by users(s)/guest, to be enjoyed simultaneously. Next, and at 920 the guest can be connected to the users in form of a virtual representation via a virtual reality generation component, as described in detail supra. Subsequently, and at 930 a virtual representation for guest interaction can be selected, e.g., holographic representation, avatar, and the like. Users(s) and virtual guests can interact therebetween, and although guests are only present virtually (e.g., electronically present with other objects/user within the environment) such virtual invitation enables a user and guests to concurrently experience the entertainment together (e.g., a live sporting event, spectator game)—so that the user actually senses (e.g., feels) presence of the virtual guest (e.g., oral real-time communication, visual real time exchange between virtual guest and user, and the like). Upon request by user/virtual guest or end of event, virtual guest can end or exit the session at 940.

Figure 10:
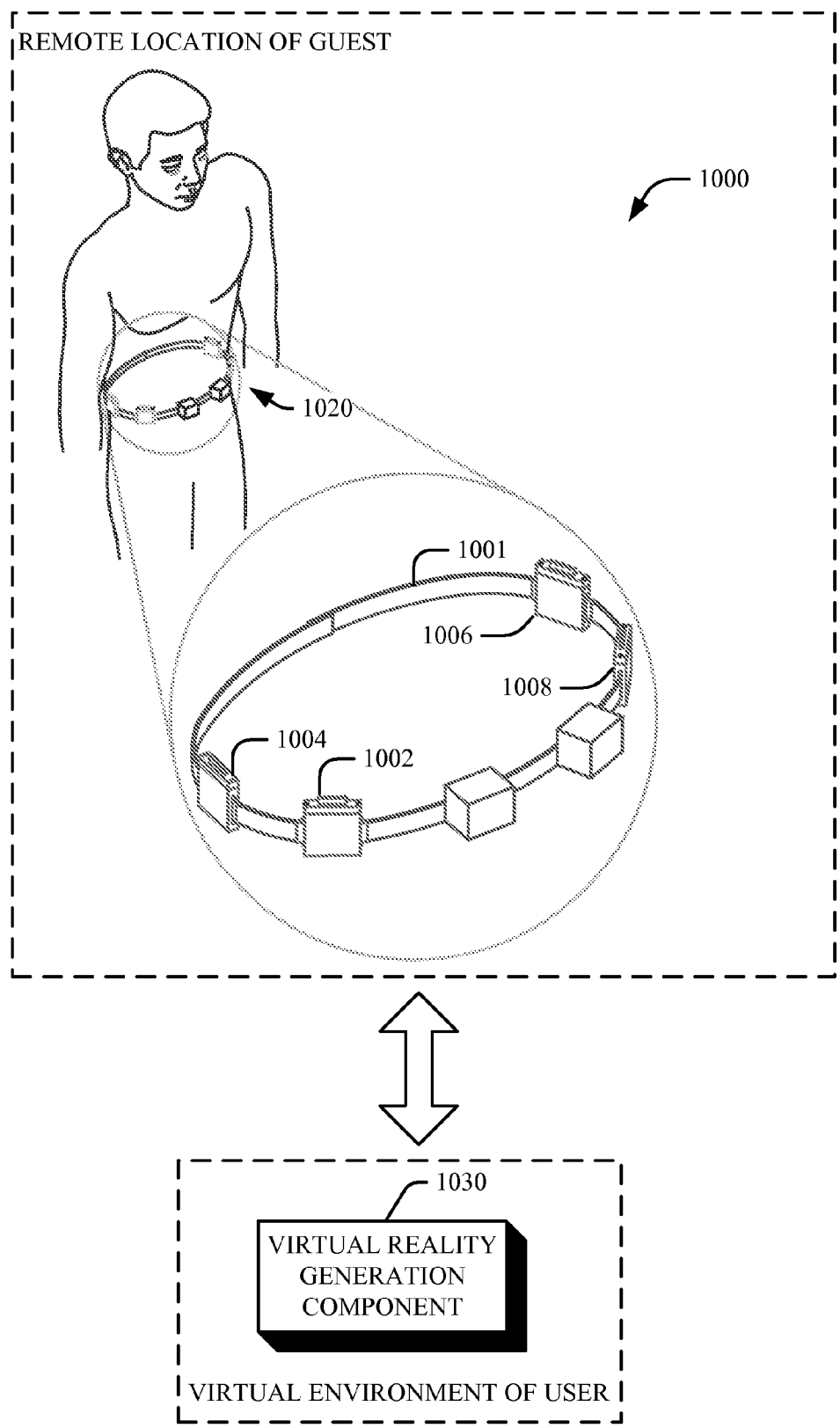
FIG. 10 illustrates a spatial distribution of modular components around a guest, to track bodily movements for mimicking by an avatar/holograph.

FIG. 10 illustrates a system of tracking body movements for a guest in a remote location, to gather data for mimicking virtual representation of such guest's performance in real time to a user, or any desired object as determined by the virtual reality generation component. Typically, from remote locations guests who have accepted the virtual invitation can wear the system 1000, and can control their virtual presence thru avatars that represent them, (e.g., data generated from electronic and electromagnetic tracking components 1002, 1004, 1006 and 1008 can monitor bodily movement at remote guest location, and transfer such movements to a respective avatar and/or holographic virtual guest representation, at user location.) Such electromagnetic tracking components are in communication with a plurality of movement indicating sensors (not shown), which are secured at a number of predetermined positions to determine movements of the guest who wears the belt 1001. Typically, any movement by the guest wearer, including wrist, arm, and foot movements, generates data indicative of the movement and controls an object in the virtual reality generation component 1030.

It is to be appreciated that various tracking components for a distributed control system 1000 can be spatially distributed along a common communication link, (e.g., such as a belt 1001 around a user's body as illustrated in FIG. 10.) Data can be communicated with such components 1002-1008 over a common communication link, or network, wherein all modules on the network communicate via a standard communications protocol.

Such collected data can be transmitted to the virtual reality generation component for processing in real time. The movement indicating data can be continuously processed within a virtual reality program, which is associated with the virtual reality generation component 1030. Accordingly, an object such as an avatar that represents the guest in virtual form (virtual guest) in the user setting has movements that substantially mimic the movements of the guest wearer. Moreover, bend sensors and pressure sensors can also be employed and connected to data collecting components 1002-1008. For example, the data collecting components 1002-1008 receive signals generated by a bend sensor(s) or pressure sensors, and processes the signals for transmitting movement indicating data to a recipient computer. The data collection unit can also include a low-pass filter (not shown) for removing noise in the signals received from the sensors.

An analog-to-digital signal converter (not shown) can also be provided for obtaining a representative data value for each of the signals generated by the bend and pressure sensors. After conversion, gathered data can be further normalized to provide signals indicating actual movement of the articulations of the guest wearer and to calibrate the sensors to accommodate for varying ranges of motion, for example. The normalized data can then be transmitted to the virtual reality generation component 1030 (e.g., associated with the virtual reality system and/or presentation engine) to implement holographic avatars, for example. Moreover, various health indicia (such as blood pressure, heart rate, and the like) of the guests can be monitored, and presented to a user, to enhance level of interaction between users and virtual guests—e.g., to signify excitement.

Figure 11:
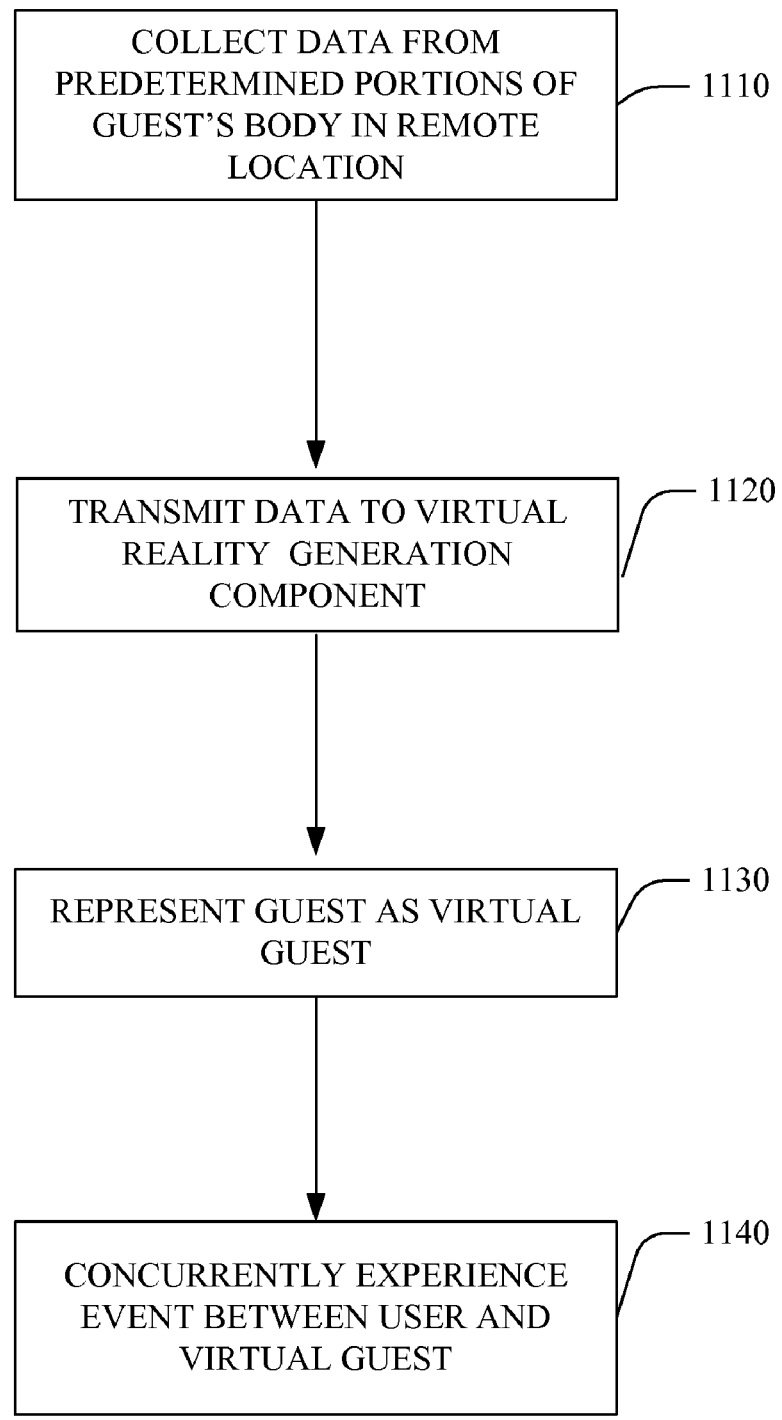
FIG. 11 illustrates a related methodology of mimicking a guest interaction as a virtual guest.

FIG. 11 illustrates a related methodology of data collection and transfer to an avatar that represents a virtual guest in accordance with an aspect of the subject innovation. Initially, and at 1110 data can be collected from predetermined locations on a body of the guest who has accepted a virtual invitation from a user. Next, and at 1120, the collected data can be forwarded to the virtual reality generation component. For example, the data from the data collection unit can be fed into a computer associated with the virtual reality generation component for processing, while the position and orientation data is also processed. The data is processed and fed in real time to control a program, such as a virtual reality program, running on such virtual reality generation component. Thus, the plurality of movement indicating sensors can generate and transmit data indicative of any movements of the guest. Movements by the guest in a remote location, including wrist, arm, and foot movements are transmitted to a computer associated with the virtual system for processing and generation of virtual guest. The movement indicating data is continuously processed so that an object, such as a character in a virtual reality program running on the computer, has corresponding real time movements analogous to the movements of the corresponding guest in a remote location.

Such virtual reality generation component can supply a graphic, scent and/or audio; wherein interconnected computers, video and audio processing devices, supply a live interaction between a user and a guest(s). Next, and at 1130, guests can be represented virtually (e.g., electronically present with other objects/user within the environment). At 1140, the virtual invitation arrangement of the subject innovation enables a user and guests to concurrently experience the entertainment together (e.g., a live sporting event, spectator game), wherein the user can feel actual presence of guest(s) in same environment (e.g., full duplex communication while experiencing the event, odor, visual prompts exchange with virtual guest, data exchange and the like.)

As used in herein, the terms "component," "system" and the like are intended to refer to a computer-related entity, either hardware, a combination of hardware and software, software or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation may be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
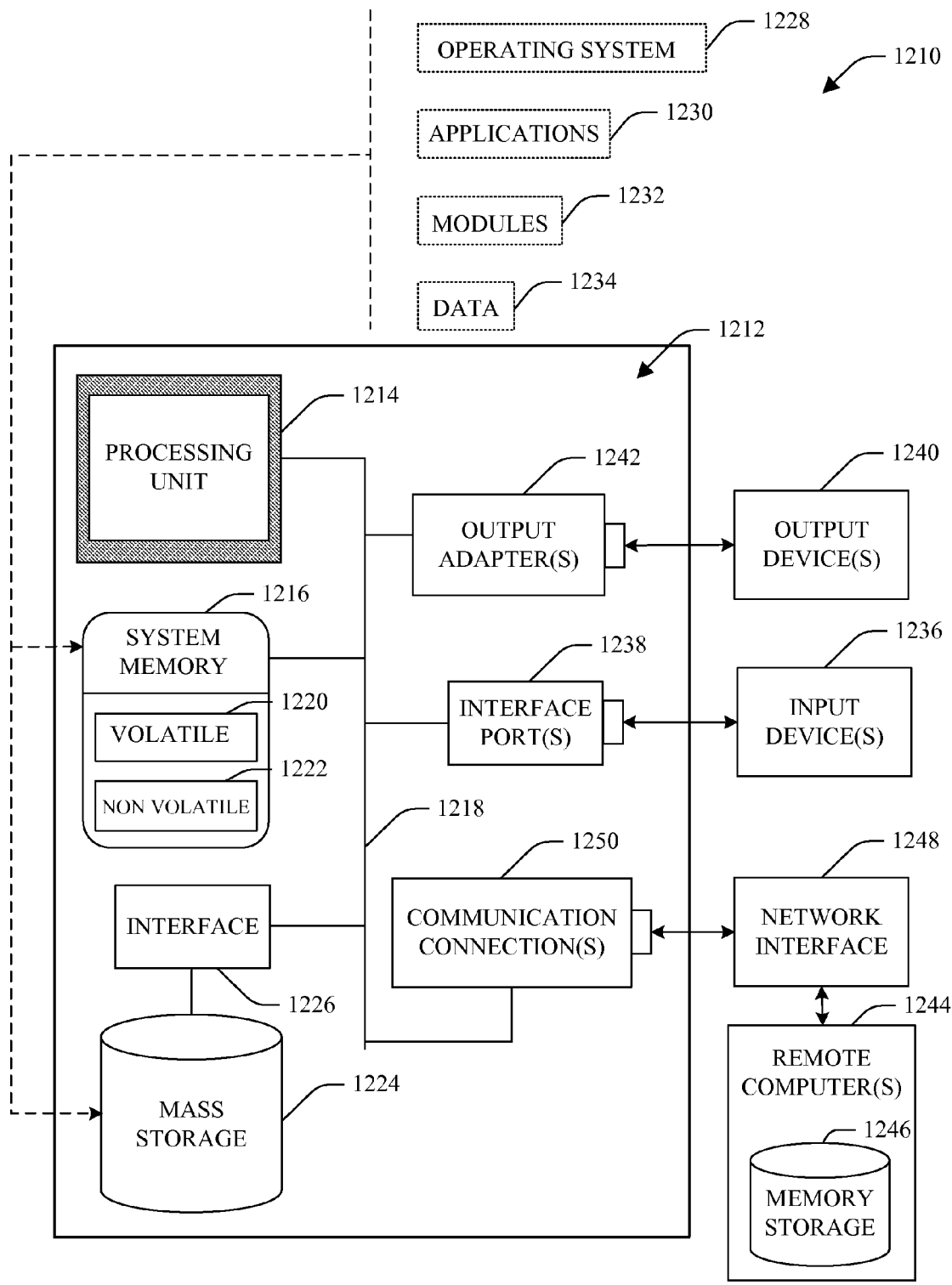
FIG. 12 illustrates an exemplary operating environment for implementing various aspects of the subject innovation.
Figure 13:
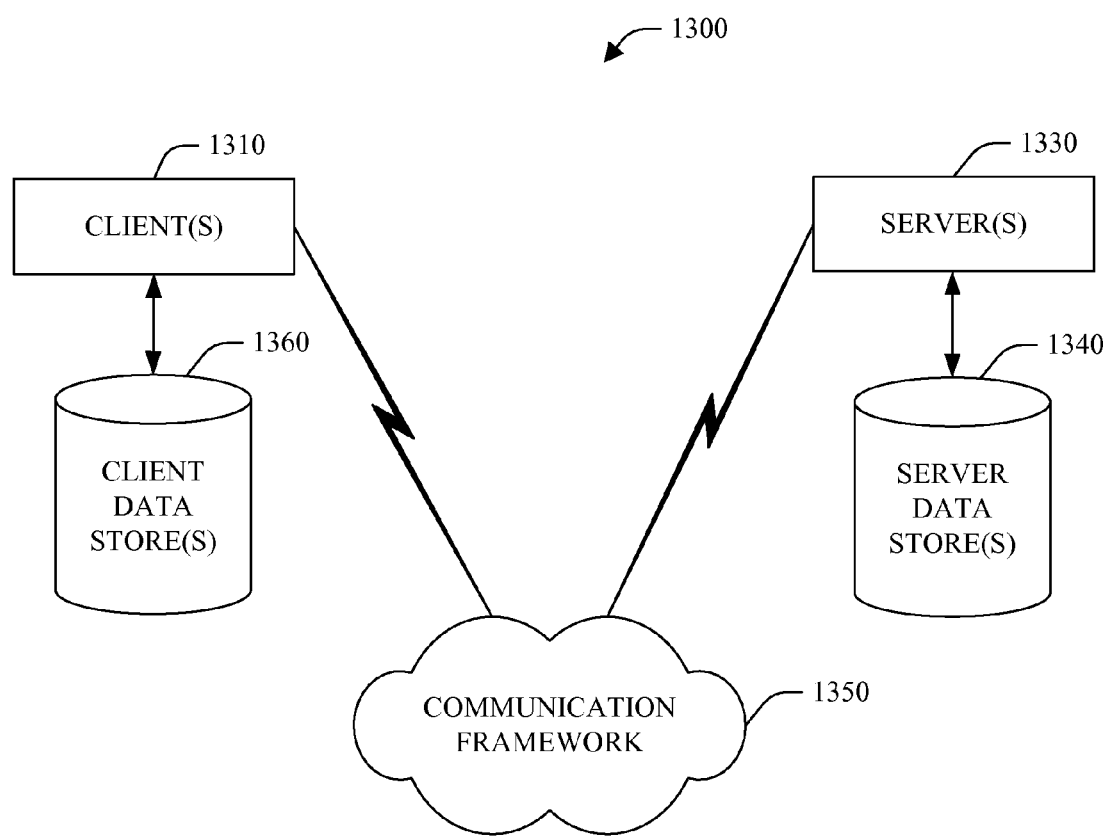
FIG. 13 is a schematic block diagram of a sample-computing environment with which the subject innovation can interact

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 12, an exemplary environment 1210 for implementing various aspects of the subject innovation includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures (e.g., multi-core) also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory.

Computer 1212 also includes removable/non-removable, volatile/non-volatile computer storage media. FIG. 12 illustrates, for example, mass or auxiliary storage 1224. Mass storage 1224 includes, but is not limited to, devices like a magnetic disk drive, floppy disk drive, tape drive, Jaz drive, Zip drive, LS-100 drive, flash memory card, or memory stick. In addition, mass storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on mass storage 1224 and loaded to system memory 1216, acts to control and allocate resources of the system 1212. System applications 1230 take advantage of the management of resources by operating system 1228 through program modules 1232 and program data 1234 stored either in system memory 1216 or on mass storage 1224. It is to be appreciated that the subject innovation can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel, CRT, LCD, plasma . . . ), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected (e.g., wired or wirelessly) via communication connection 1250. Network interface 1248 encompasses communication networks such as local-area networks (LAN) and wide-area networks (WAN).

Communication connection(s) 1250 refers to the hardware/software employed to connect the network interface 1248 to the bus 1218. While communication connection 1250 is shown for illustrative clarity inside computer 1216, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330. For example, the virtual reality component can be associated with server(s) 1330. This web service server can also be communicatively coupled with a plurality of other servers 1330, as well as associated data stores 1340, such that it can function as a proxy for the client 1310.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer implemented system comprising:
   at least one processor that executes the following computer executable components stored on at least one computer readable medium:
   a virtual reality generation component that emulates real-life activities of a guest that is remotely viewing a spectator event that takes place outside of a virtual environment into corresponding virtual activities of a virtual guest representation in the virtual environment; and
   a presentation component that presents the virtual activities of the virtual guest representation to a user that is attending the spectator event as an in-person spectator, the presentation system to facilitate an interaction of the user with the virtual guest representation provided in the virtual environment as the guest is remotely viewing the spectator event.

2. The computer implemented system of claim 1, further comprising a background isolation component that filters noise and light associated with a background of the spectator event.

3. The computer implemented system of claim 1, wherein the virtual guest representation is in form of a holographic avatar that represents the guest.

4. The computer implemented system of claim 1, further comprising a three dimensional projection unit that presents the virtual guest representation to the user.

5. The computer implemented system of claim 4, wherein the presentation component further comprises goggles wearable by the user.

6. The computer implemented system of claim 1, further comprising an electromagnetic tracking device that monitor bodily movement of the guest.

7. The computer implemented system of claim 1 further comprising a graphical user interface that provides a portal for accessing spectator related services associated with the virtual guest representation.

8. The computer implemented system of claim 7, further comprising a presentation engine that provides the bodily movements of the guest as corresponding movements of the virtual guest representation to the user.

9. The computer implemented system of claim 7, further comprising a graphical user interface that controls interaction of the user with the virtual guest representation during the spectator event.

10. The computer implemented system of claim 1, wherein the virtual reality generation component comprises an aggregator component that combines data associated with a plurality of virtual guests.

11. The computer implemented system of claim 10, further comprising a viewing control component that enhances spectator data related to the interaction of the virtual guest representation and the user.

12. The computer implemented system of claim 10, further comprising an artificial intelligence component that facilitates the interaction between the user and the virtual guest representation.

13. The computer implemented system of claim 1, further comprising a viewing control component that couples a virtual camera with one or more participants of the event.

14. A computer implemented method comprising:
   employing a processor to execute computer readable instructions stored on a computer readable medium to perform the following acts:
   inviting at least two guests to be virtual guests to a spectator broadcast event that takes place outside of a virtual environment, wherein the at least two guests are viewing the spectator broadcast event at remote locations;
   populating the at least two virtual guests into the virtual environment to simulate presence of the at least two virtual guests to a user that invited the at least two guests to view the spectator broadcast event by representing each virtual guest with a corresponding avatar;
   monitoring one or more health indicia of each guest that includes at least one of a blood pressure or a heart rate; and
   presenting each avatar as showing one or more corresponding health indicia as the user interacts with the at least two virtual guests during the spectator broadcast event.

15. The computer implemented method of claim 14, wherein each guest selects the corresponding avatar that represents the guest in the virtual environment.

16. The computer implemented method of claim 14, wherein the user is attending the spectator broadcast event in person.

17. The computer implemented method of claim 14, wherein each avatar is a holographic avatar.

18. The computer implemented method of claim 14, further comprising employing an artificial intelligence component to enhance interaction between the user and the at least two virtual guests.

19. The computer implemented method of claim 14, further comprising ending interaction between the user and the at least two virtual guests.

20. A computer implemented method comprising:
   employing a processor to execute computer readable instructions stored on a computer readable medium to perform the following acts:
   displaying in a virtual environment a virtual guest representation that represents a guest that is virtually invited to view a shared broadcast event that is attended by a user, the shared broadcast event taking place outside of the virtual environment, wherein the guest is located at a remote location;

filtering at least some of the background noise and background light present at the shared broadcast event from being transmitted to the guest via the virtual environment during concurrent experience of the shared broadcast event by the user and the guest;
monitoring one or more health indicia of the guest;

presenting the virtual guest representation as showing the one or more health indicia as the user interacts with the virtual guest representation during the shared broadcast event.

\* \* \* \* \*

UNITED STATES PATENT AND TRADEMARK OFFICE
CERTIFICATE OF CORRECTION

| | | |
|---|---|---|
| PATENT NO. | : 8,012,023 B2 | Page 1 of 1 |
| APPLICATION NO. | : 11/536449 | |
| DATED | : September 6, 2011 | |
| INVENTOR(S) | : William H. Gates, III et al. | |

It is certified that error appears in the above-identified patent and that said Letters Patent is hereby corrected as shown below:

In column 15, line 58, in Claim 6, delete "monitor" and insert -- monitors --, therefor.

Signed and Sealed this
Twenty-ninth Day of November, 2011

David J. Kappos
*Director of the United States Patent and Trademark Office*